No. 772,139. PATENTED OCT. 11, 1904.
J. A. EDMUNDSON.
FOUNTAIN.
APPLICATION FILED DEC. 15, 1903.
NO MODEL.
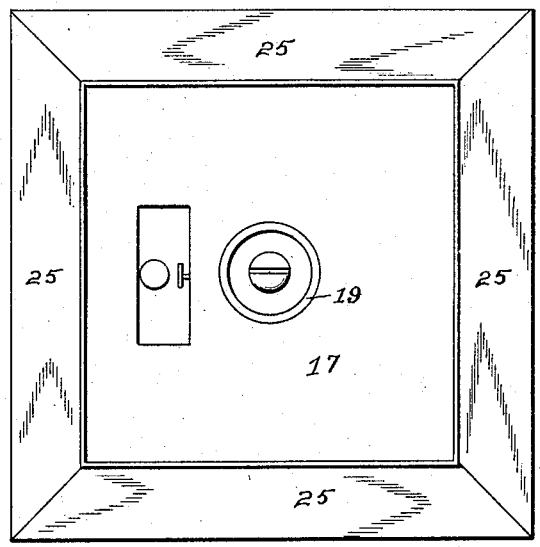
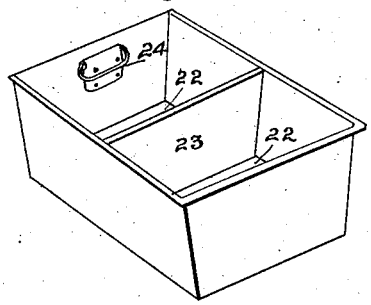
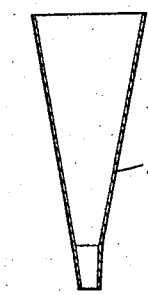
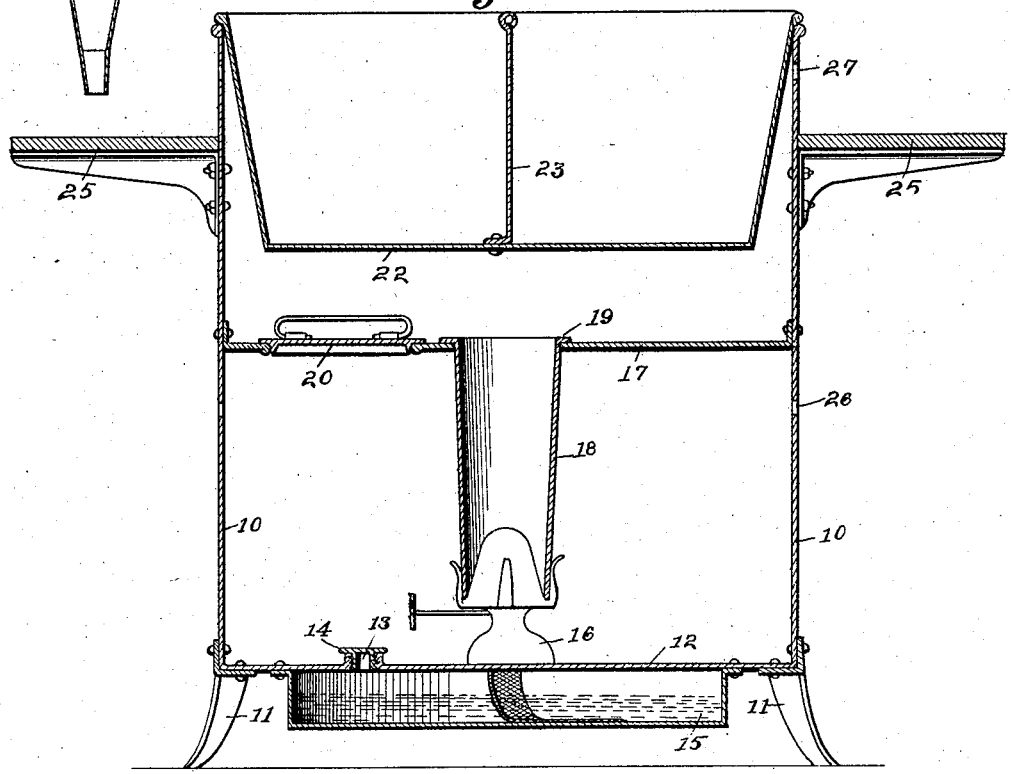
Witnesses
C. G. Hague.
S. F. Christy.
Inventor J. A. Edmundson
Orwig & Lane attys No. 772,139. Patented October 11, 1904.

UNITED STATES PATENT OFFICE.

JOHN A. EDMUNDSON, OF MITCHELLVILLE, IOWA.

FOUNTAIN.

SPECIFICATION forming part of Letters Patent No. 772,139, dated October 11, 1904.

Application filed December 15, 1903. Serial No. 185,220. (No model.)

*To all whom it may concern:*

Be it known that I, JOHN A. EDMUNDSON, a citizen of the United States, residing at Mitchellville, in the county of Polk and State of Iowa, have invented certain new and useful Improvements in Fountains, of which the following is a specification.

The objects of my invention are to provide a trough used in watering animals, the water in which can be easily and readily prevented from freezing by the use of my lamp, which is designed to be mounted beneath said trough.

A further object is to provide a device of this class from which the trough can be easily removed from the frame of the device and easy access had to fill the tank with oil, mounted at the bottom of the framework, and easy access also had to the lamp, and, further, to provide a device of this class so arranged and constructed that there will be no danger whatever of the lamp setting fire to the buildings in which the fountain is placed, for the reason that the entire lamp is incased in a metallic frame. This will also prevent the poultry or other animals using the tank from being burned.

A further object is to provide a trough which is divided into separate portions for the water and for the food.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 is a cross-sectional view of the complete device. Fig. 2 is a plan view of the device with the trough removed. Fig. 3 shows in perspective the trough removed from the frame; and Fig. 4 is a sectional view of the funnel, the lower end of which is designed to be placed in the opening in the top of the oil-tank when filling said tank.

Referring to the accompanying drawings, I have used the reference-numeral 10 to indicate the frame of my device, which is very nearly square and is made of a metallic substance and has a bottom portion between the sides thereof. Attached at each of the lower corners of this frame is a leg 11, designed to support the frame some distance above the ground or floor upon which my device is placed.

The bottom of the frame I have designated by the numeral 12, said bottom having a screw-threaded opening 13 extending through it and having a cap 14 for said screw-threaded opening and designed to close said opening. Mounted beneath the bottom 12 is an oil-tank 15, into which the opening 13 leads. Mounted on top of the bottom 12 and communicating with the tank 15 is a lamp 16, so that a large amount of oil can be restored in the tank and the lamp kept burning for a considerable length of time.

Extending across the frame and attached to the sides thereof is the partition 17, having an opening through which the chimney 18 of the lamp is designed to pass, said chimney being supported by the partition 17, by means of the flange 19, at the top portion of said chimney. There is also an opening in the partition 17 immediately above the opening 13 in the bottom 12. There is a cover 20 for this opening, so arranged that it can be easily inserted into the opening or removed from it, and said cover is designed to be removed when the operator desires to obtain access to the lamp or to refill the tank. Preferably there is a funnel 21 of such size that it can be easily inserted through the opening in the partition, in which the cover 20 is designed to be mounted and the lower end of which is designed to enter the opening 13, so that the operator can easily fill the tank 15 with oil from above the partition 17.

Detachably mounted in the upper portion of the frame is the trough 22, having a partition 23 extending across it. This trough has the handles 24 at each end thereof and on the interior of the trough, so arranged that these handles may be easily grasped to remove the tank from the upper portion of the frame. Extending around the outside of the upper portion of the frame is a shelf 25, so arranged that the animals desiring to obtain access to the trough can perch upon said shelf 25, and thus be near the trough. This shelf 25 is made sufficiently wide so that a chicken or other fowl may easily walk around the trough on this shelf. In the sides of the frame and below the partition 17 I have provided the openings 26, designed to admit air into the chamber below the partition 17 and above the bottom 12. Near the upper portion of the sides of the frame and above the shelf 25 are the openings 27, designed to allow the air to pass freely into the space beneath the trough when it is in position in the frame.

In practical operation the tank 15 is filled with oil, the cap 14 is put in position, the lamp 16 is lighted, and the cover 20 put in position. (Shown in Fig. 1 of the drawings.) The trough 22 is then placed in position and one side of the trough 22 is filled with water and the other side with food. Sufficient air will be supplied to the lamp by the openings 26 and 27, and the substance in the tank 22 can be kept warm and prevent it from freezing at any time of the year. The animals can easily obtain access to the food and water in the manner above designated. The trough can be used as well for one animal as another, and if used for horses or other larger animals the shelf 25 would preferably be removed, so that more easy access would be had to the trough 22.

Having thus described my invention, what I claim, and desire to secure by Letters Patent of the United States therefor, is—

1. A frame, an oil-tank adjacent to the frame, a lamp communicating therewith, a trough detachably mounted in the frame above said lamp, and a shelf extending around the frame near its upper portion and adjacent to the trough, for the purposes stated.

2. A frame, an oil-tank mounted adjacent to the bottom of the frame, a lamp communicating with said tank, a partition extending across the frame designed to support the chimney of said lamp, said partition having an opening extending through it, a cover for said opening, and a trough mounted above said partition in said frame, for the purposes stated.

3. A frame, an oil-tank mounted adjacent to the bottom of the frame, a lamp communicating with said tank, a partition extending across the frame designed to support the chimney of said lamp, said partition having an opening extending through it, a cover for said opening, and a detachably-mounted trough above said partition in said frame, for the purposes stated.

4. A frame, an oil-tank mounted adjacent to the bottom of the frame, a lamp communicating with said tank, a partition extending across the frame designed to support the chimney of said lamp, said partition having an opening extending through it, a cover for said opening, a trough mounted above said partition in said frame, and a shelf extending around said frame and adjacent to the top of it.

5. A frame, an oil-tank mounted adjacent to the bottom of the frame, a lamp communicating with said tank, a partition extending across the frame designed to support the chimney of said lamp, said partition having an opening extending through it, a cover for said opening, a detachably-mounted trough above said partition in said frame, and a shelf extending around said frame and adjacent to the top of it.

6. A frame, an oil-tank mounted adjacent to the bottom of the frame, a lamp communicating with said tank, a partition extending across the frame designed to support the chimney of said lamp, said partition having an opening extending through it, a cover for said opening, a trough mounted above said partition in said frame, and a partition extending across said trough, for the purposes stated.

7. A frame, an oil-tank mounted adjacent to the bottom of the frame, a lamp communicating with said tank, a partition extending across the frame designed to support the chimney of said lamp, said partition having an opening extending through it, a cover for said opening, a detachably-mounted trough above said partition in said frame, and a partition extending across said trough, for the purposes stated.

8. A frame, an oil-tank mounted adjacent to the bottom of the frame, a lamp communicating with said tank, a partition extending across the frame designed to support the chimney of said lamp, said partition having an opening extending through it, a cover for said opening, a trough mounted above said partition in said frame, a shelf extending around said frame and adjacent to the top of it, and a partition extending across said trough, for the purposes stated.

9. A frame, an oil-tank mounted adjacent to the bottom of the frame, a lamp communicating with said tank, a partition extending across the frame designed to support the chimney of said lamp, said partition having an opening extending through it, a cover for said opening, a detachably-mounted trough above said partition in said frame, a shelf extending around said frame and adjacent to the top of it, and a partition extending across said trough, for the purposes stated.

10. A frame, an oil-tank mounted adjacent to the bottom of the frame, a lamp communicating with said tank, a partition extending across the frame and designed to support the chimney of the lamp, and a trough mounted above said partition in said frame.

11. A frame, an oil-tank mounted adjacent to the bottom of the frame, a lamp communicating with said tank, a partition extending across the frame designed to support the chimney of said lamp, said partition having an opening through it, the sides of said frame having openings extending through them above and below said partition and a trough mounted above said partition in said frame.

12. A frame, an oil-tank mounted adjacent to the bottom of the frame, a lamp communicating with said tank, a trough detachably mounted in the frame, handles attached to said trough for detaching it from the frame, and a partition extending transversely of said trough.

13. A frame, an oil-tank adjacent to the bottom of the frame, a lamp communicating with said tank, a trough detachably mounted in the frame, handles attached to said trough for detaching it from the frame, and a partition, having an opening therein through which access may be had to the lamp, extending across the frame, beneath said trough, designed to support the chimney of said lamp.

JOHN A. EDMUNDSON.

Witnesses:
S. F. CHRISTY,
W. R. LANE.